United States Patent

Tseng

[11] Patent Number: 5,901,807
[45] Date of Patent: May 11, 1999

[54] ELECTRICAL DRIVE FOR A BICYCLE

[75] Inventor: Diing-huang Tseng, Chanhua Hsien, Taiwan

[73] Assignee: Merida Industry Co., Ltd., Changhua Hsien, Taiwan

[21] Appl. No.: 08/932,135

[22] Filed: Sep. 18, 1997

[51] Int. Cl.$^6$ .................................................. B62K 11/00
[52] U.S. Cl. .......................................... 180/206; 180/220
[58] Field of Search .................................. 180/205, 206, 180/207, 220; 280/236, 237, 238

[56] References Cited

U.S. PATENT DOCUMENTS

| | | | |
|---|---|---|---|
| 2,553,465 | 11/1951 | Monge | 180/206 |
| 3,773,131 | 11/1973 | Jaulmes | 180/205 |
| 4,164,153 | 8/1979 | Moritsch et al. | 280/261 |
| 4,637,274 | 1/1987 | Goldenfeld | 180/205 |
| 4,706,982 | 11/1987 | Hartmann | 180/206 |
| 5,370,200 | 12/1994 | Takata | 180/206 |
| 5,375,676 | 12/1994 | Takata et al. | 180/206 |
| 5,454,766 | 10/1995 | Mills | 280/259 |
| 5,474,148 | 12/1995 | Takata | 180/206 |
| 5,570,752 | 11/1996 | Takata | 180/206 |
| 5,662,364 | 9/1997 | Toronto et al. | 280/252 |
| 5,758,736 | 6/1998 | Yamauchi | 180/220 |
| 5,829,546 | 11/1998 | Tseng | 180/206 |

FOREIGN PATENT DOCUMENTS

| | | |
|---|---|---|
| 0517224 | 9/1992 | European Pat. Off. . |
| 0636538 | 1/1995 | European Pat. Off. . |
| 0683093 | 2/1995 | European Pat. Off. . |
| 0700826 | 3/1996 | European Pat. Off. . |
| 0798203 | 1/1997 | European Pat. Off. . |
| WO 95/21090 | 8/1995 | WIPO . |

Primary Examiner—J J Swann
Assistant Examiner—Andrew J. Fischer
Attorney, Agent, or Firm—William E. Pelton, Esq.

[57] ABSTRACT

An electrical drive includes a housing mounted on a crank axle for partially receiving the axle. A driven ratchet base is rotatably mounted on a first end portion of the crank axle and includes a first end portion fixedly engaged with a chain wheel and a second end portion formed with a driven bevel gear. A drive bevel gear meshes with the driven bevel gear for rotating the driven ratchet base. A drive ratchet base is rotatably mounted on a mediate portion of the crank axle and includes a first end portion engaged with the second end portion of the driven ratchet base for rotating the driven ratchet base along one direction only, and a second end portion formed with a first engaging bevel gear. A ring element is fixedly mounted on the mediate portion of the crank axle to rotate therewith, and two pivot axles each extend from an outer wall of the ring element and each have a second engaging bevel gear rotatably mounted and meshing with the first engaging bevel gear. A retaining bevel gear meshes with each of the two second engaging bevel gears and is fixedly retained by an inner wall of the housing.

5 Claims, 9 Drawing Sheets

ELECTRICAL DRIVE FOR A BICYCLE

FIELD OF THE INVENTION

The present invention relates to an electrical drive, and more particularly to an electrical drive for a bicycle.

BACKGROUND OF THE INVENTION

A conventional electrical drive can output a determined amount of power supply to co-operate with physical pedaling of a rider so as to drive a bicycle synchronously, thereby providing an auxiliary function to displace the bicycle. However, the conventional electric drive cannot precisely control power and voltages required for moving the bicycle, thereby easily causing a waste of power supply.

The present invention has arisen to mitigate and/or obviate disadvantages of the conventional electrical drive.

SUMMARY OF THE INVENTION

In accordance with one aspect of the present invention, there is provided an electrical drive in combination with a bicycle including a crank axle rotatably mounted and having a first end portion and a second end portion, and a chain wheel disposed on the first end portion of the crank axle.

The electrical drive comprises a housing mounted on the crank axle for partially receiving the crank axle. A driven ratchet base is rotatably mounted on the first end portion of the crank axle and includes a first end portion fixedly engaged with the chain wheel and a second end portion formed with a driven bevel gear.

A drive gear is rotatably mounted in the housing and includes a first end portion and a second end portion formed with a drive bevel gear meshing with the driven bevel gear for rotating the driven ratchet base.

A drive ratchet base is rotatably mounted on a mediate portion of the crank axle and includes a first end portion engaged with the second end portion of the driven ratchet base for rotating the driven ratchet base along one direction only, and a second end portion formed with a first engaging bevel gear.

A ring element is fixedly mounted on the mediate portion of the crank axle to rotate therewith, and two diametrically opposite pivot axles each extend from an outer wall of the ring element. Two second engaging bevel gears are each rotatably mounted on a corresponding one of the two pivot axles and each mesh with the first engaging bevel gear.

A retaining bevel gear fitted on the second end portion of the crank axle meshes with each of the two second engaging bevel gears and is fixedly retained by an inner wall of the housing.

Further features of the present invention will become apparent from a careful reading of the detailed description with appropriate reference to the accompanying drawings.

DETAILED DESCRIPTION OF THE PREFERRED EMBODIMENTS

Figure 1:
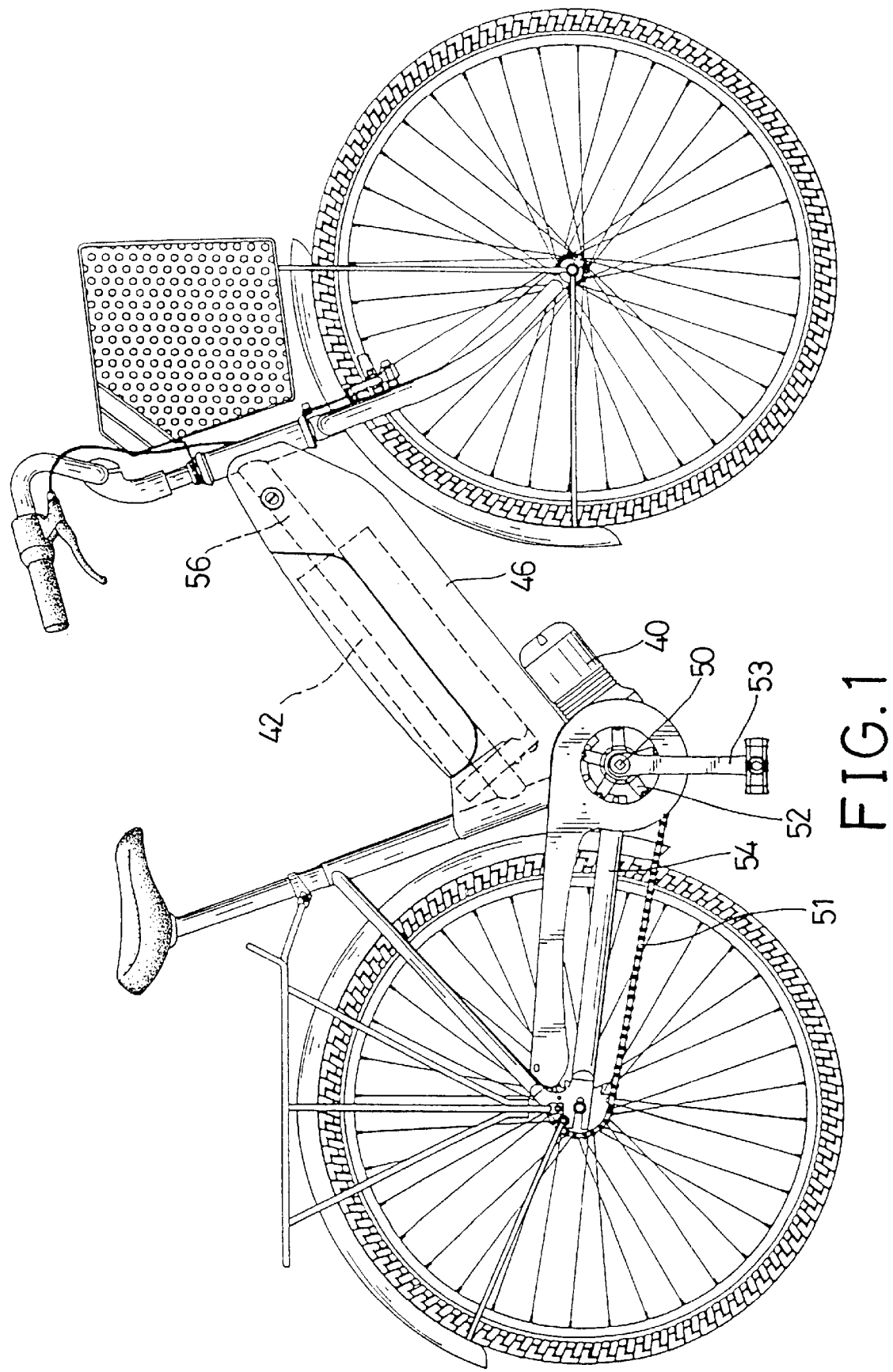
FIG. 1 is a front view of a bicycle in accordance with the present invention.
Figure 2:
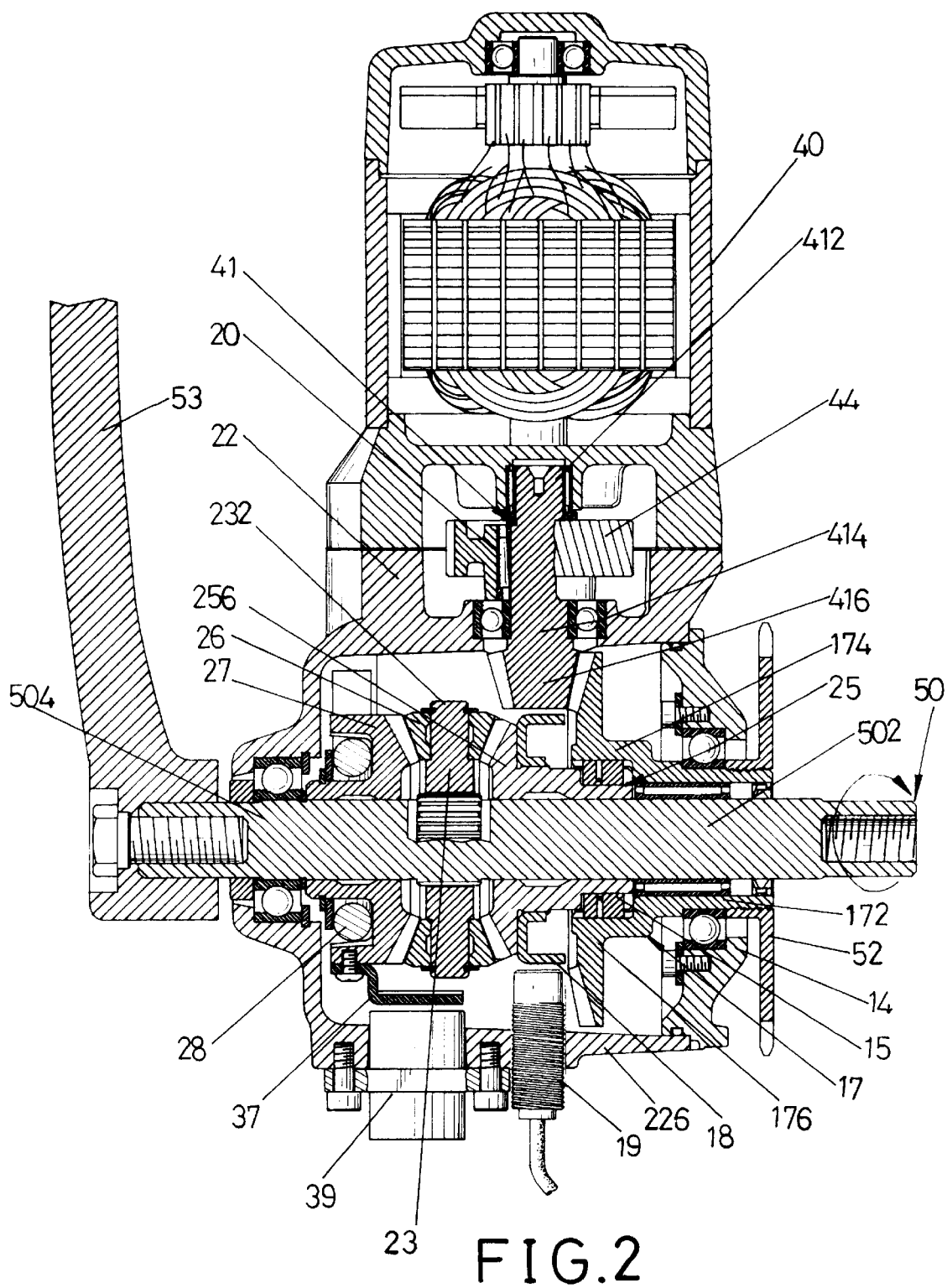
FIG. 2 is top plan cross-sectional view of an electric drive in accordance with the present invention.
Figure 3:
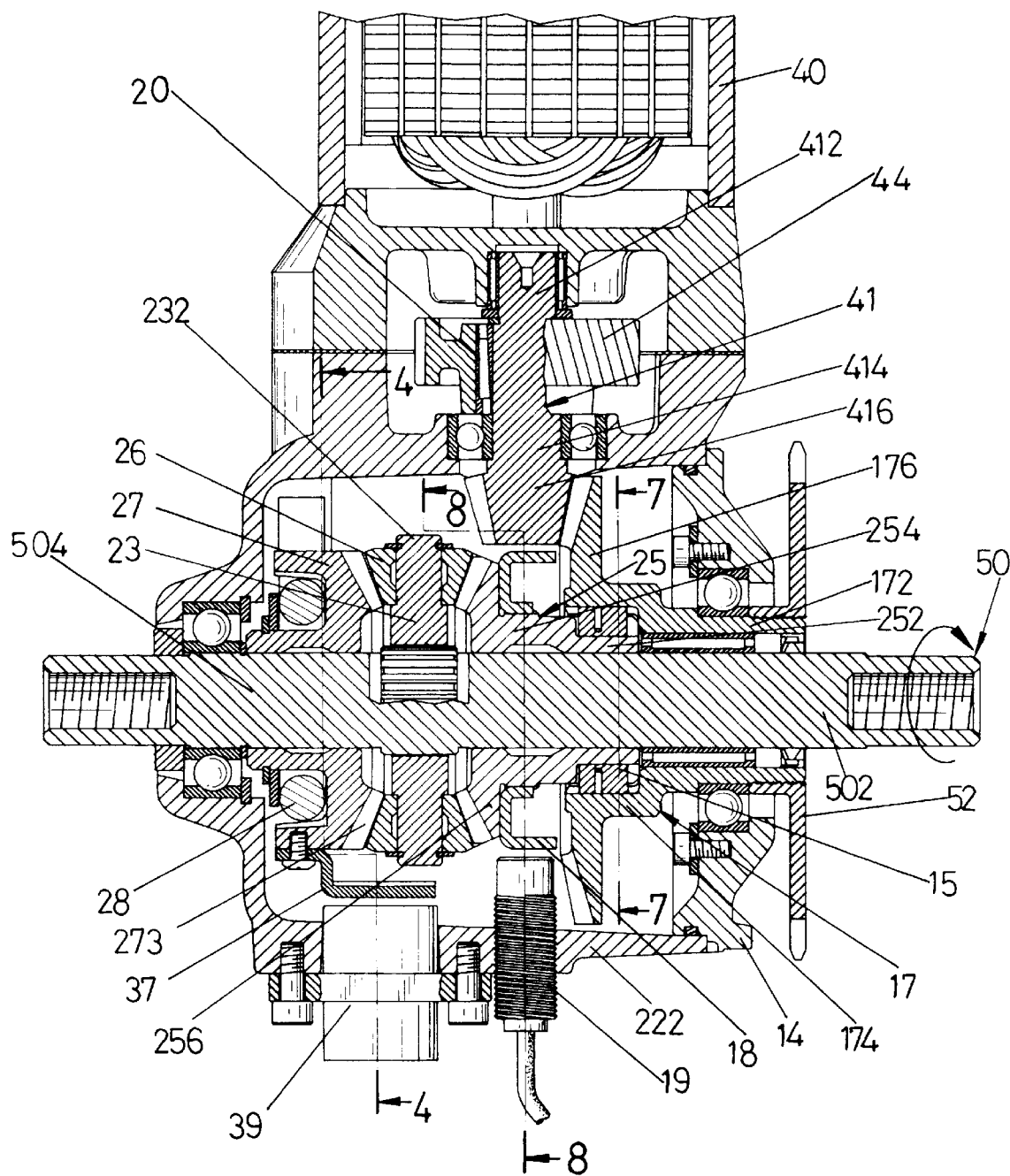
FIG. 3 is a partially enlarged view of FIG. 2.
Figure 4:
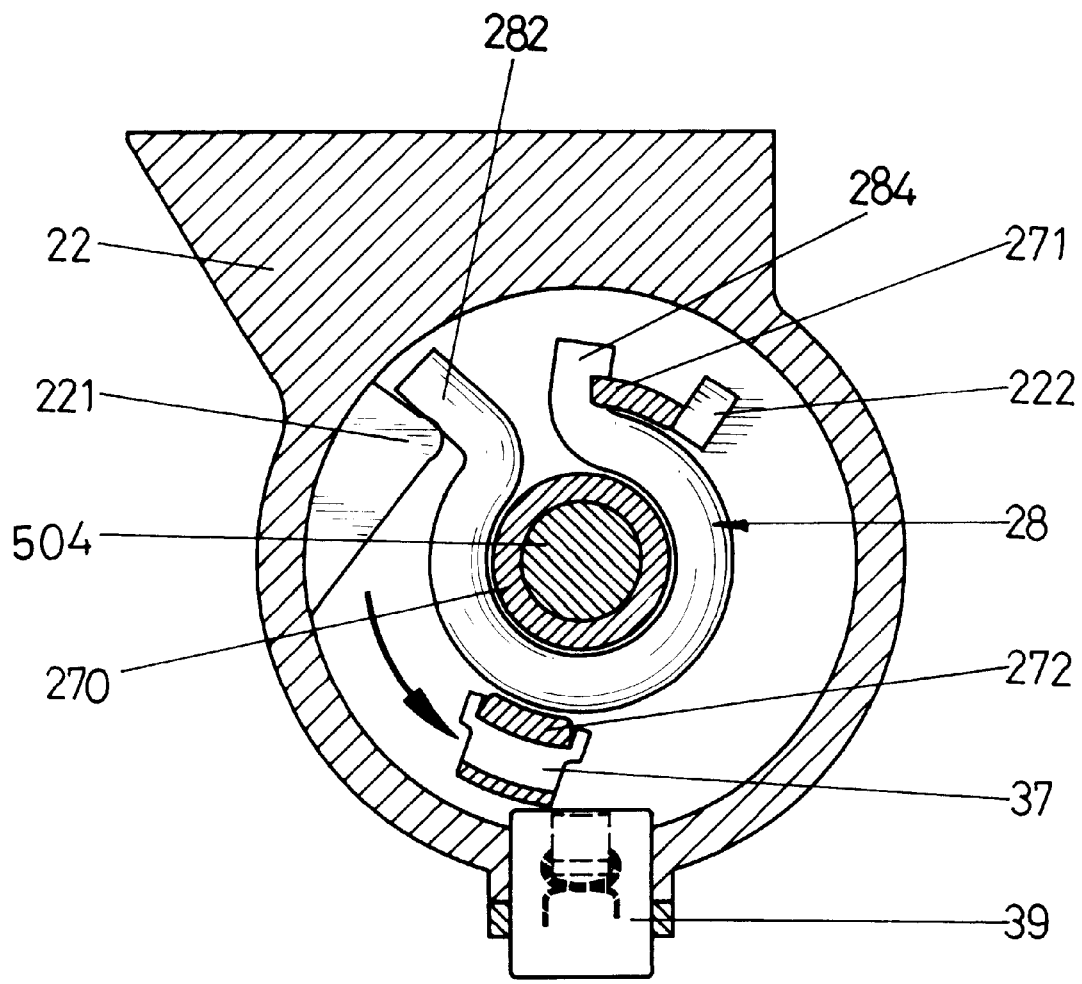
FIG. 4 is a side cross-sectional view taken along the line 4—4 of FIG. 3.

Referring to the drawings, and initially to FIGS. 1–3, an electrical drive in accordance with the present invention can be provided for a bicycle which comprises a down tube 56, a pair of chain stays 54, a crank axle 50 rotatably disposed between the down tube 56 and the chain stays 54 and having a first end portion 502 and a second end portion 504, two crank arms 53 each fixedly mounted around the first and second end portions 502 and 504 of the crank axle 50 respectively, a chain wheel 52 rotatably disposed on the first end portion 502 of the crank axle 50, and a drive chain 51 meshing with the chain wheel 52 to move therewith.

The electrical drive comprises a housing 22 mounted around the crank axle 50 for partially containing the crank axle 50. Preferably, the housing 22 includes an open end portion 226 fixedly connected with an end cap 14.

A driven ratchet base 17 is rotatably mounted on the first end portion 502 of the crank axle 50 and includes a first end portion 172 fixedly engaged with the chain wheel 52 and a second end portion 174 formed with a driven bevel gear 176.

A drive gear 41 is rotatably mounted in the housing 22 and includes a first end portion 412 and a second end portion 414 formed with a drive bevel gear 416 meshing with the driven bevel gear 176 for rotating the driven ratchet base 17.

A driving mechanism is mounted on the housing 22 for driving the drive gear 41 and includes a helical gear 44 mounted on the first end portion 412 of the drive gear 41, a single direction bearing 20 mounted between the helical gear 44 and the first end portion 412 of the drive gear 41 such that the drive gear 41 can be rotated by the helical gear along one direction only, a motor 40 fixedly attached to the housing 22 and located beneath the down tube 56 for rotating the helical gear 44, and a battery box 42 fixedly mounted on the down tube 56 for supplying power to the motor 40.

Figure 9:
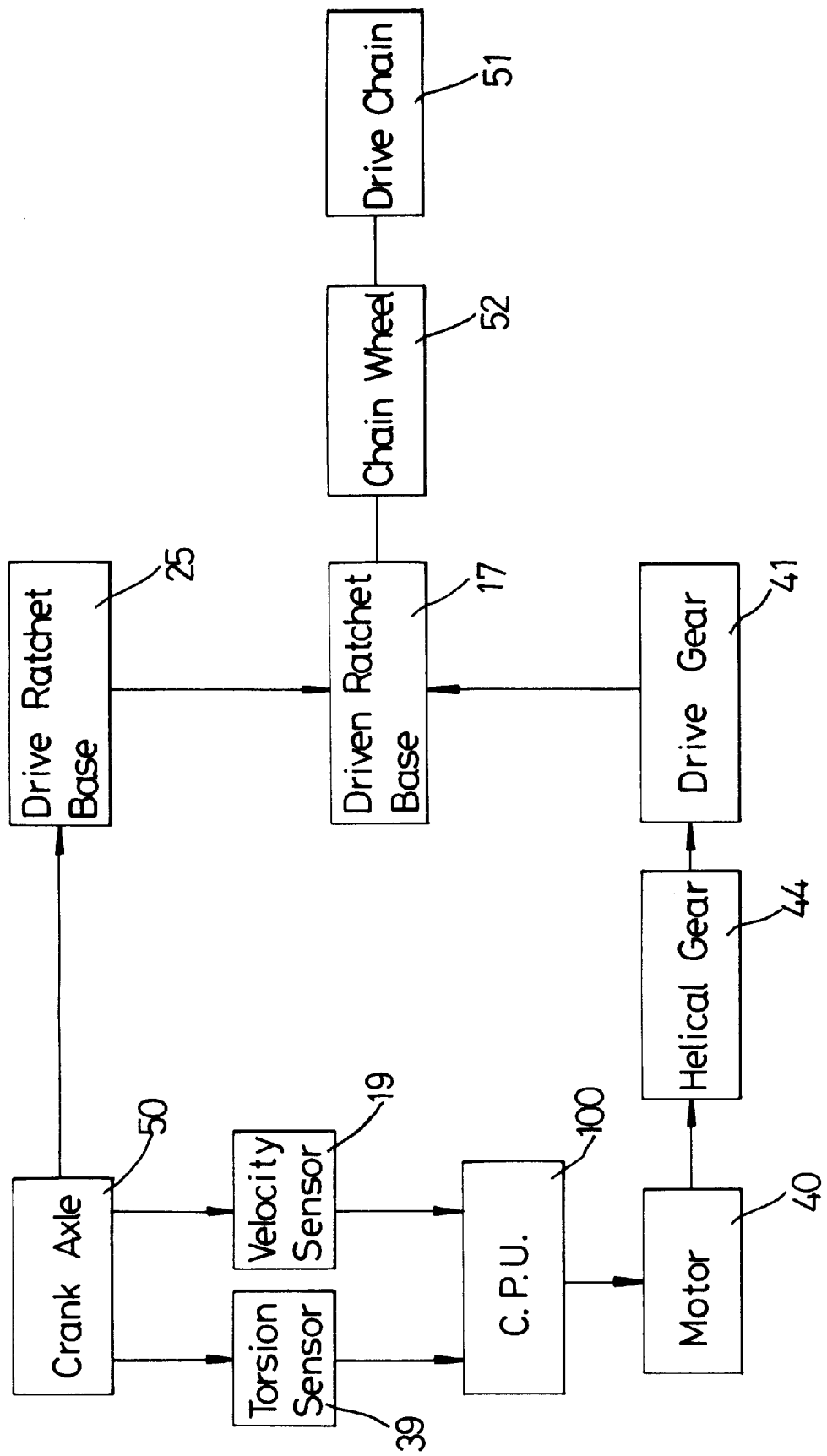
FIG. 9 is a flow chart of the electric drive.

A chamber 46 containing a central processing unit 100 (not shown in FIG. 1) as shown in FIG. 9 is mounted on the down tube 56.

A drive ratchet base 25 is rotatably mounted on a mediate portion of the crank axle 50 and includes a first end portion 252 engaged with the second end portion 174 of the driven ratchet base 17 for rotating the driven ratchet base 17 along one direction only, and a second end portion 254 formed with a first engaging bevel gear 256.

A ring element 23 is fixedly mounted on the mediate portion of the crank axle 50 to rotate therewith, and two diametrically opposite pivot axles 232 each extend from an outer wall of the ring element 23.

Two second engaging bevel gears 26 are each rotatably mounted on a corresponding one of the two pivot axles 232 and each mesh with the first engaging bevel gear 256.

Figure 5:
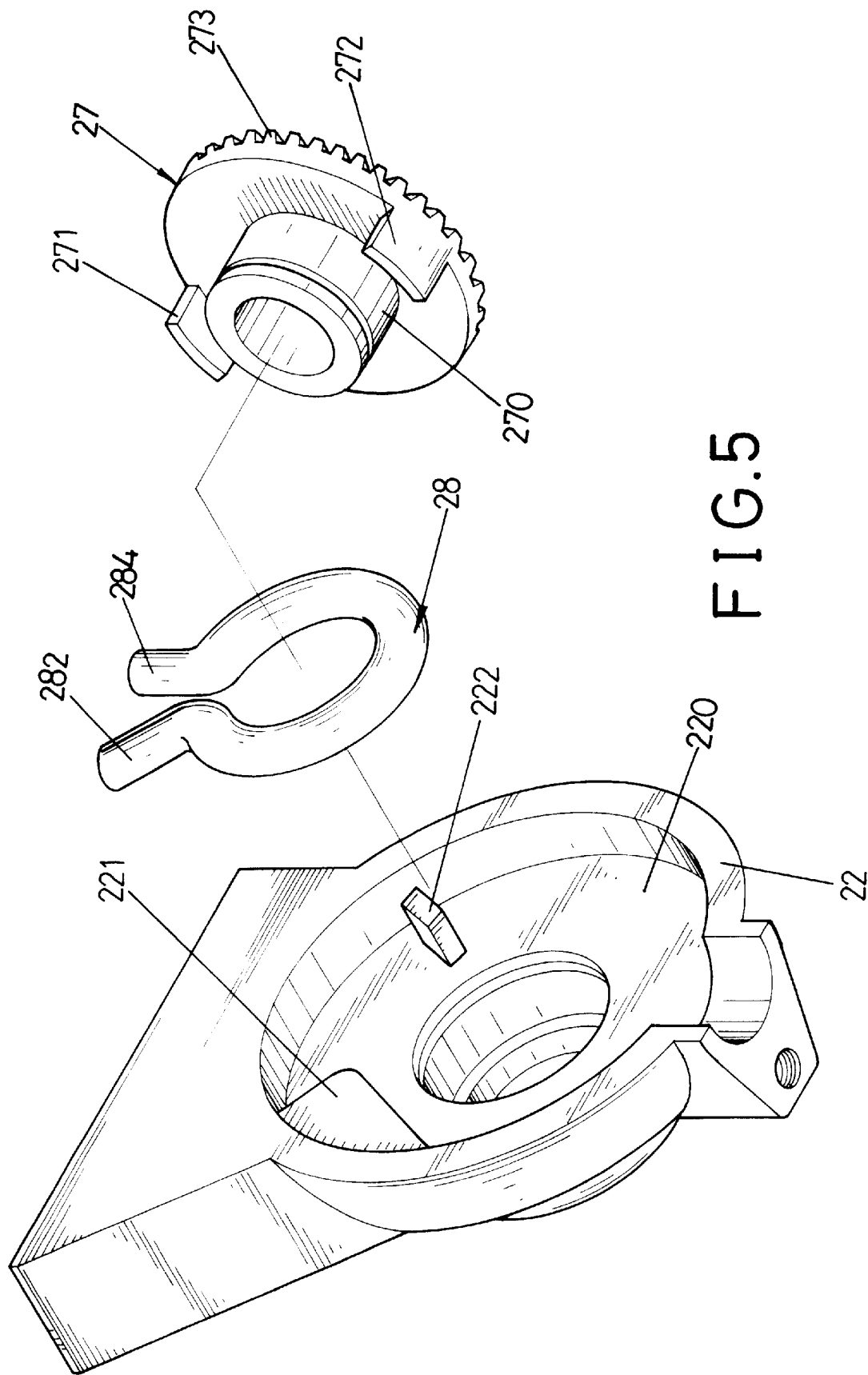
FIG. 5 is a perspective view of FIG. 4.
Figure 6:
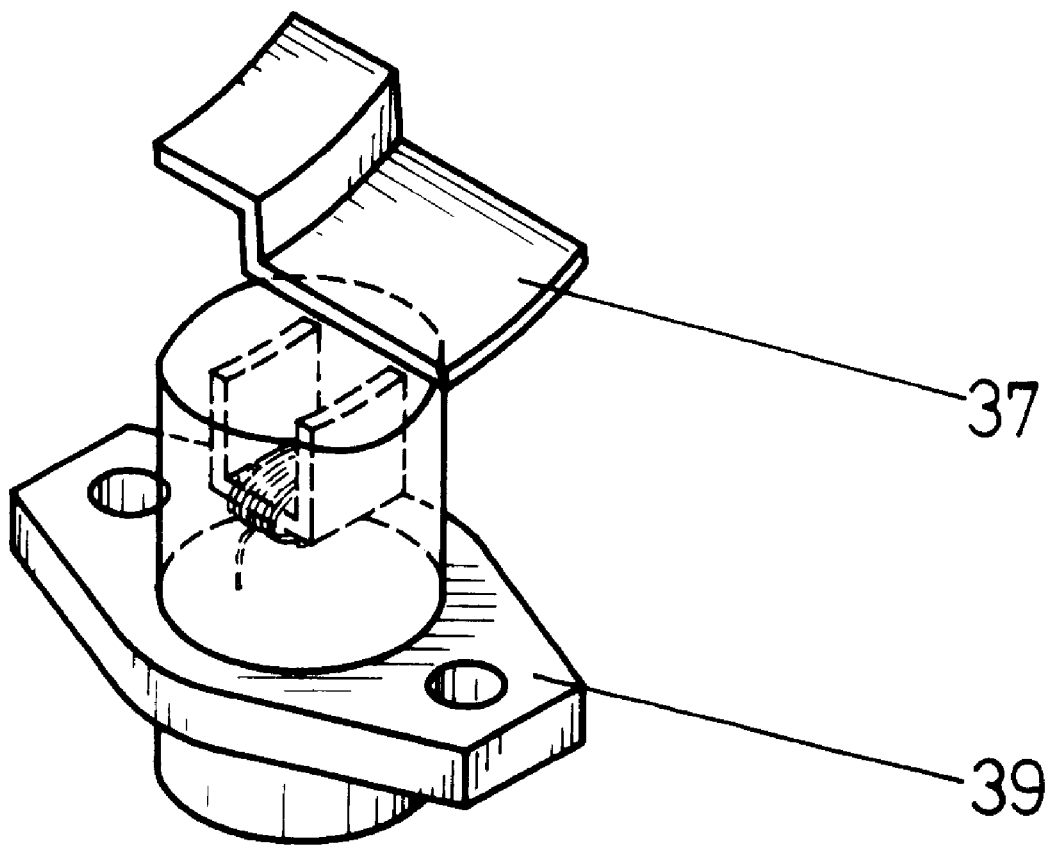
FIG. 6 is a cross-sectional view taken from the line 4—4 of FIG. 5.

A retaining bevel gear 27 meshing with each of the two second engaging bevel gears 26 is fitted on the second end portion 504 of the crank axle 50 and is fixedly retained by an inner wall 220 (see FIG. 5) of the housing 22.

Referring now to FIGS. 2–6, the inner wall 220 of the housing 22 is formed with a first stop 221 and a second stop 222 spaced from each other.

The retaining bevel gear 27 includes a first side formed with a meshing surface 273 meshing with each of the two second engaging bevel gears 26 and a second side formed with a sleeve 270 mounted on the second end portion 504 of the crank axle 50.

An abutting block 271 is formed on a periphery of the second side of the retaining bevel gear 27 and abuts on the second stop 222. A lug 272 located diametrically opposite to the abutting block 271 is formed on the periphery of the second side of the retaining bevel gear 27.

A C-shaped torsional spring 28 is mounted on the sleeve 270 and includes a first end portion formed with a first extension 282 urged on the first stop 221 and a second end portion formed with a second extension 284 urged on the abutting block 271.

A torsion sensing piece 37 is fixedly mounted on the lug 272 to move therewith. A torsion sensor 39 is fixedly mounted on the housing 22 and is located adjacent to the torsion sensing piece 37 for sensing a torsion exerted on the crank axle 50.

Figure 7:
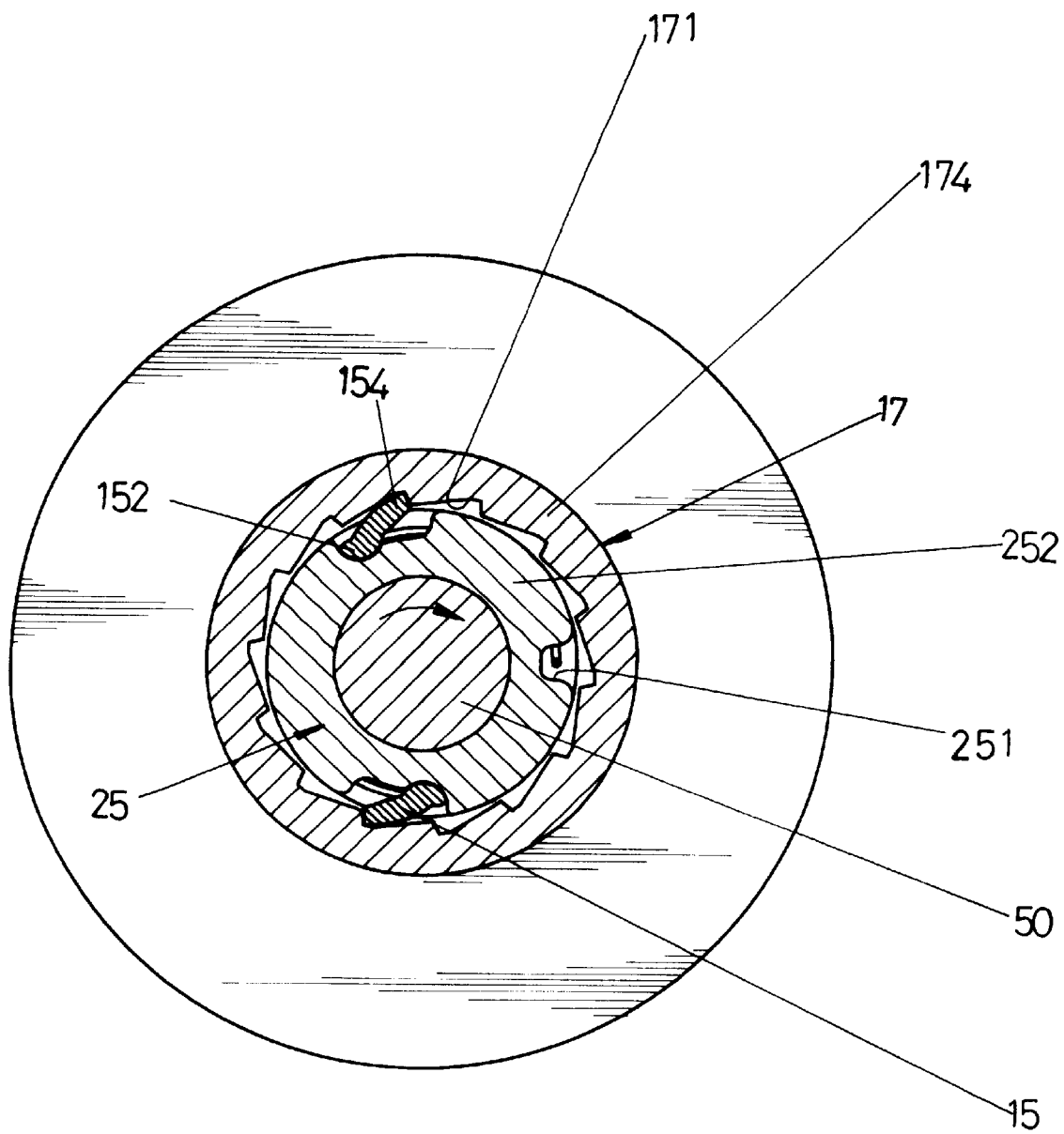
FIG. 7 is a side cross-sectional view taken along the line 7—7 of FIG. 3.

Referring to FIG. 7 with reference to FIGS. 2 and 3, the second end portion 174 of the driven ratchet base 17 includes an inner wall formed with a plurality of teeth 171, the first end portion 252 of the drive ratchet base 25 includes an outer wall defining a plurality of recesses 251, and a plurality of pawls 15 each include a first end portion 152 pivotally fitted in a corresponding one of the recesses 251 and a second end portion 154 detachably meshing with the teeth 171.

Figure 8:
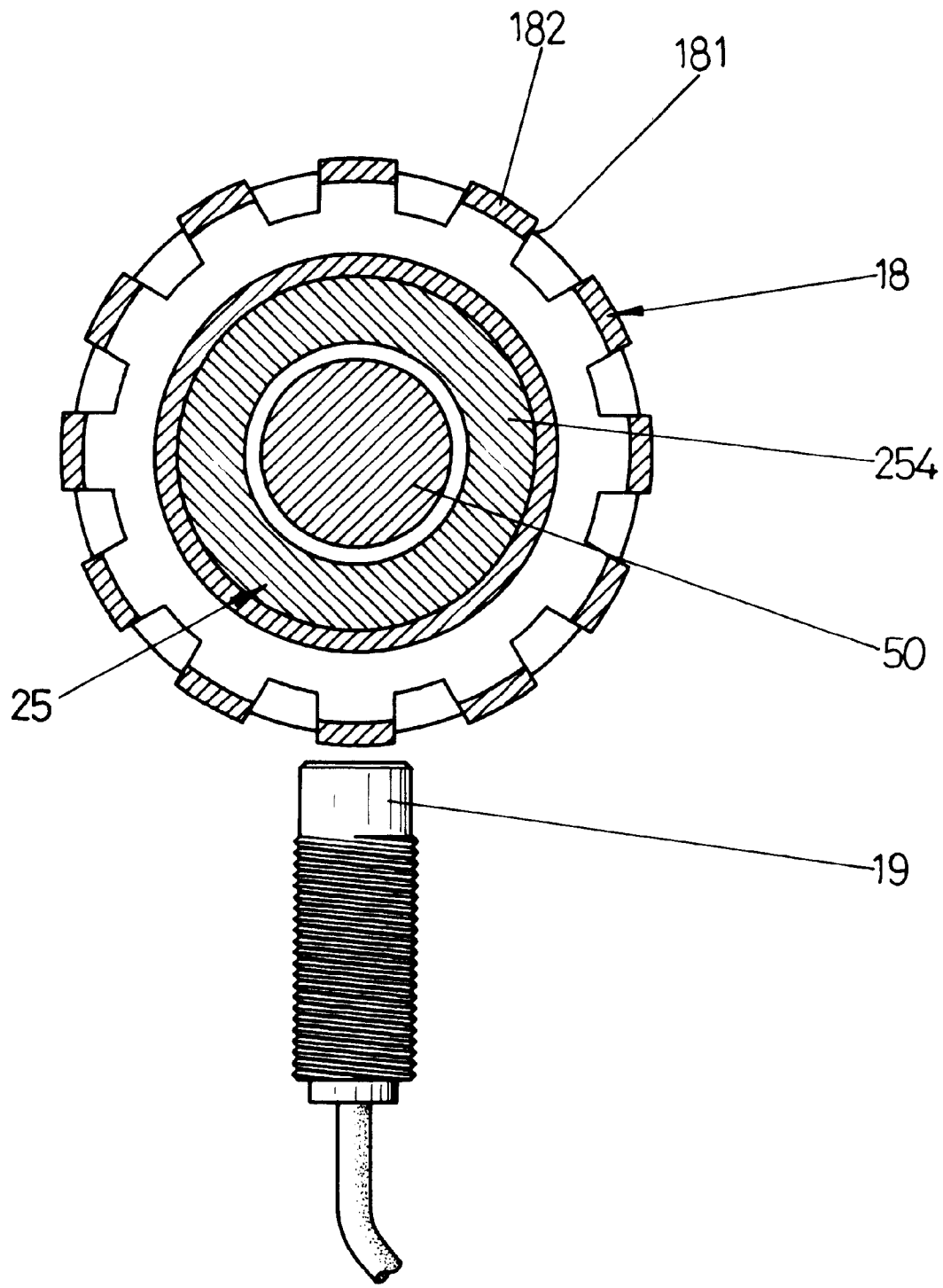
FIG. 8 is a side cross-sectional view taken along the line 8—8 of FIG. 3.

Referring to FIG. 8 with reference to FIGS. 2 and 3, a velocity sensing race 18 is fixedly mounted on the second end portion 254 of the drive ratchet base 25 to rotate therewith, and a velocity sensor 19 is fixedly mounted on the housing 22 and located adjacent to the velocity sensing race 18 for sensing a rotational velocity of the crank axle 50.

The velocity sensing race 18 includes an outer wall formed with a plurality of sensing faces 182 spaced at an equal distance from each other, and a plurality of cavities 181 each defined between adjacent two of the sensing faces 182.

In operation, referring to FIGS. 1–3 with reference to FIGS. 4–8, the crank axle 50 can be rotated by means of a rider exerting a torque on the two crank arms 53, thereby rotating the ring element 23 which in turn drives each of two second engaging bevel gears 26 to move therewith.

At the same time, the retaining bevel gear 27 is retained by the torsional spring 28 and the first stop 221 such that each of two second engaging bevel gears 26 meshing with the fixed retaining bevel gear 27 can be rotated by the retaining bevel gear 27 when the ring element 23 is rotated by the crank axle 50.

The drive ratchet base 25 can then be rotated by means of the first engaging bevel gear 256 meshing with each of the two second engaging bevel gears 26, thereby rotating the driven ratchet base 17 along one direction only such that the chain wheel 52 meshing with the drive chain 51 can be rotated by the driven ratchet base 17 to move the bicycle forwardly.

Then, the helical gear 44 can be driven by the motor 40 to rotate the drive gear 41 along one direction only which can in turn rotate the driven ratchet 17 by means of the drive bevel gear 416 meshing with the driven bevel gear 176 such that the chain wheel 52 can be rotated by the driven ratchet base 17 to move the bicycle, thereby providing an assistance for moving the bicycle forwardly.

By such an arrangement, the bicycle can be driven to travel forwardly by means of physical work of the rider and by means of electrical power synchronously.

Referring to FIGS. 3 and 8, the velocity sensor 19 co-operating with the velocity sensing race 18 can be used to detect the rotational velocity of the crank axle 50.

Referring to FIGS. 3–6, when the crank axle 50 is rotated, the retaining bevel gear 27 can be rotated by the crank axle 50 to move the abutting block 271 which in turn compresses the torsional spring 28.

The lug 272 together with the torsion sensing piece 37 can be moved by the retaining bevel gear 27, and the torsion sensor 39 can be used to detect the torsion exerted on the retaining bevel gear 27 by the torsional spring 28 depending on the amount of displacement of the torsion sensing piece 37, thereby measuring the torsion exerted on the crank axle 50 by the rider.

In such a situation, the displacement of the torsional spring 28 is limited by the first and second stops 221 and 222 such that the retaining bevel gear 27 can be rotated by a small angle.

Referring now to FIGS. 3 and 9, the velocity sensor 19 can input signals indicating rotational velocities of the crank axle 50 and the torsion sensor 39 can input signals indicating torsions exerted by the rider on the crank axle 50 into the central processing unit 100 synchronously which can perform an analytic operation to determine power and voltages required for the motor 40 to drive the helical gear 44 by means of such as a pulse width modulation (P.W.M.), thereby precisely controlling the motor 40 to rotate the driven ratchet base 17 by the helical gear 44 co-operating with the drive gear 41 to rotate the chain wheel 52, thereby providing a proper assistance for moving the bicycle.

By such an arrangement, the power supplied by the motor 40 to drive the drive gear 41 can be controlled, thereby optimizing the efficiency of the supplied electricity.

It should be clear to those skilled in the art that further embodiments may be made without departing from the scope and spirit of the present invention.

What is claimed is:

1. An electrical drive in combination with a bicycle including a crank axle (50) rotatably mounted and having a first end portion (502) and a second end portion (504), and a chain wheel (52) disposed on said first end portion (502) of said crank axle (50), said electrical drive comprising:

a housing (22) mounted on said crank axle (50);

a driven ratchet base (17) rotatably mounted on said first end portion (502) of said crank axle (50) and including a first end portion (172) fixedly engaged with said chain wheel (52) and a second end portion (174) formed with a driven bevel gear (176);

a drive gear (41) rotatably mounted in said housing (22) and including a first end portion (412) and a second end portion (414) formed with a drive bevel gear (416) meshing with said driven bevel gear (176) for rotating said driven ratchet base (17);

a drive ratchet base (25) rotatably mounted on a mediate portion of said crank axle (50) and including a first end portion (252) engaged with said second end portion (174) of said driven ratchet base (17) for rotating said driven ratchet base (17) along one direction only, and a second end portion (254) formed with a first engaging bevel gear (256);

a ring element (23) fixedly mounted on said mediate portion of said crank axle (50) to rotate therewith, and two diametrically opposite pivot axles (232) each extending from an outer wall of said ring element (23);

two second engaging bevel gears (26) each rotatably mounted on a corresponding one of said two pivot axles (232) and each meshing with said first engaging bevel gear (256); and a retaining bevel gear (27) fitted on said second end portion (504) of said crank axle (50) and meshing with each of said two second engaging bevel gears (26) and fixedly retained by an inner wall (220) of said housing (22).

2. The electrical drive in accordance with claim 1, wherein said inner wall (220) of said housing (22) is formed with a first stop (221) and a second stop (222) spaced from each other, said retaining bevel gear (27) includes a first side formed with a meshing surface (273) meshing with each of said two second engaging bevel gears (26) and a second side formed with a sleeve (270) mounted on said second end portion (504) of said crank axle (50), an abutting block (271) fixedly mounted on a periphery of said second side of said retaining bevel gear (27) and abutting on said second stop (222), a lug (272) fixedly mounted on said periphery of said second side of said retaining bevel gear (27) and located diametrically opposite to said abutting block (271), a C-shaped torsional spring (28) mounted on said sleeve (270) and including a first end portion formed with a first extension (282) urged on said first stop (221) and a second end portion formed with a second extension (284) urged on said abutting block (271), a torsion sensing piece (37) fixedly mounted on said lug (272) to move therewith, and a torsion sensor (39) fixedly mounted on said housing (22) and located adjacent to said torsion sensing piece (37) for sensing a torsion exerted on said crank axle (50).

3. The electrical drive in accordance with claim 1, wherein said second end portion (174) of said driven ratchet base (17) includes an inner wall formed with a plurality of teeth (171), said first end portion (252) of said drive ratchet base (25) includes an outer wall defining a plurality of recesses (251), and a plurality of pawls (15) each include a first end portion (152) pivotally fitted in a corresponding one of said recesses (251) and a second end portion (154) detachably meshing with said teeth (171).

4. The electrical drive in accordance with claim 1, further comprising a velocity sensing race (18) fixedly mounted on said second end portion (254) of said drive ratchet base (25) to rotate therewith, and a velocity sensor (19) fixedly mounted on said housing (22) and located adjacent to said velocity sensing race (18) for sensing a rotational velocity of said crank axle (50).

5. The electrical drive in accordance with claim 4, wherein said velocity sensing race (18) includes an outer wall formed with a plurality of sensing faces (182) spaced at an equal distance from each other, and a plurality of cavities (181) each defined between adjacent two of said sensing faces (182).

* * * * *